(12) United States Patent
Chen (10) Patent No.: US 8,643,925 B2
(45) Date of Patent: Feb. 4, 2014

(54) VARIABLE DISPERSION COMPENSATOR (75) Inventor: David Zhi Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 284 days.

(21) Appl. No.: 13/106,595

(22) Filed: May 12, 2011

(65) Prior Publication Data
US 2012/0288285 A1 Nov. 15, 2012

(51) Int. Cl.
G02B 26/08 (2006.01)
H04B 10/12 (2011.01)

(52) U.S. Cl.
USPC .......... 359/212.2; 359/337.5; 359/223.1; 359/877

(58) Field of Classification Search
USPC ........ 359/337.5, 212.1, 216.1, 223.1, 873, 359/876, 877
See application file for complete search history.

(56) References Cited

U.S. PATENT DOCUMENTS

| 6,296,361 | B1 * | 10/2001 | Shirasaki et al. | 359/868 |
| 6,776,493 | B1 * | 8/2004 | Kuzma | 359/615 |
| 6,934,431 | B2 * | 8/2005 | Braun et al. | 385/15 |
| 6,996,343 | B2 * | 2/2006 | Neilson | 398/84 |
| 2002/0067877 | A1 * | 6/2002 | Braun et al. | 385/15 |
| 2004/0076368 | A1 * | 4/2004 | Takushima et al. | 385/18 |
| 2004/0184153 | A1 * | 9/2004 | Neilson | 359/566 |
| 2004/0258415 | A1 * | 12/2004 | Boone et al. | 398/125 |
| 2005/0002600 | A1 * | 1/2005 | Ducellier et al. | 385/17 |
| 2005/0031248 | A1 * | 2/2005 | Kasper et al. | 385/15 |
| 2006/0140536 | A1 * | 6/2006 | Aota et al. | 385/18 |
| 2010/0183310 | A1 * | 7/2010 | Suzuki et al. | 398/81 |

OTHER PUBLICATIONS

Wu et al., "Optical MEMS for LIghtwave Communication", Journal of Lightwave Communication, vol. 24, No. 12, pp. 4433-4454 (Dec. 2006).*

* cited by examiner

Primary Examiner — Eric Bolda (57) ABSTRACT

Exemplary methods and systems for applying a correction to an initiated signal are disclosed. In some examples the correction may be a compensation for dispersion present, e.g., in an optical signal. An exemplary method may include receiving an initiated signal, and forming a curved surface with a first array of discrete elements. The exemplary method may further include impinging the initiated signal upon the curved surface, thereby applying a correction to the initiated signal determined at least in part by the curved surface.

14 Claims, 7 Drawing Sheets

VARIABLE DISPERSION COMPENSATOR

BACKGROUND

Dispersion is an optical phenomenon in which the phase velocity of a wave depends on its frequency. The most commonly understood example of dispersion is a rainbow, in which dispersion causes spatial separation of a generally white light into a plurality of different colors that are defined by the varying wavelengths present in white light. In optical systems, dispersion may cause pulses to generally spread within communication media through which the pulse is transmitted, e.g., optical fibers. Dispersion may thereby generally degrade signals, especially those transmitted over long distances. Accordingly, dispersion in optical communications systems should generally be corrected or compensated.

Known dispersion compensation systems employ a three dimensional mirror that defines a curved surface opposite the mirror. The mirror reflects an incoming optical signal through the curved surface to generally correct for any dispersion in the signal. The curved surface defines a concave portion and a convex portion separated by a transitional portion therebetween. The curvature of the three portions changes gradually across the curved surface, thereby allowing for different curvatures to be applied to the signal to provide varying amounts of positive or negative dispersion compensation.

Three-dimensional mirrors are limited by their curvature, however, in the amount of dispersion compensation they can apply to an incoming optical signal. Three-dimensional mirrors are also difficult to manufacture without imperfections that may cause undesirable signal degradation. Three-dimensional mirrors also necessarily apply compensation in a symmetrical manner, and therefore may overcorrect or undercorrect dispersion where dispersion is not symmetrical in a signal, e.g., where dispersion is concentrated at certain wavelengths. Further, no adjustment of the dispersion compensation is possible beyond the range of two-dimensional curves provided by the curved surface of a three-dimensional mirror.

Accordingly, there is a need for an improved system for compensating signal dispersion that allows for more accurate compensation and simplified manufacturing.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Various exemplary illustrations are provided herein of methods and systems for applying a correction to an initiated signal. In some examples the correction may be a compensation for dispersion present, e.g., in an optical signal. An exemplary method may include receiving an initiated signal, and forming a curved surface with a first array of discrete elements. The exemplary method may further include impinging the initiated signal upon the curved surface, thereby applying a correction to the initiated signal determined at least in part by the curved surface.

An exemplary system for applying a correction to an initiated signal may include a transmitter configured to selectively transmit an initiated signal, and at least one communication media in communication with the transmitter. The system may further include a first compensation array in communication with the transmitter and the communication media. The compensation array may include a plurality of discrete elements. The compensation array may be configured to selectively reflect the initiated signal off of the plurality of the discrete elements to apply a correction to the initiated signal.

Figure 1:
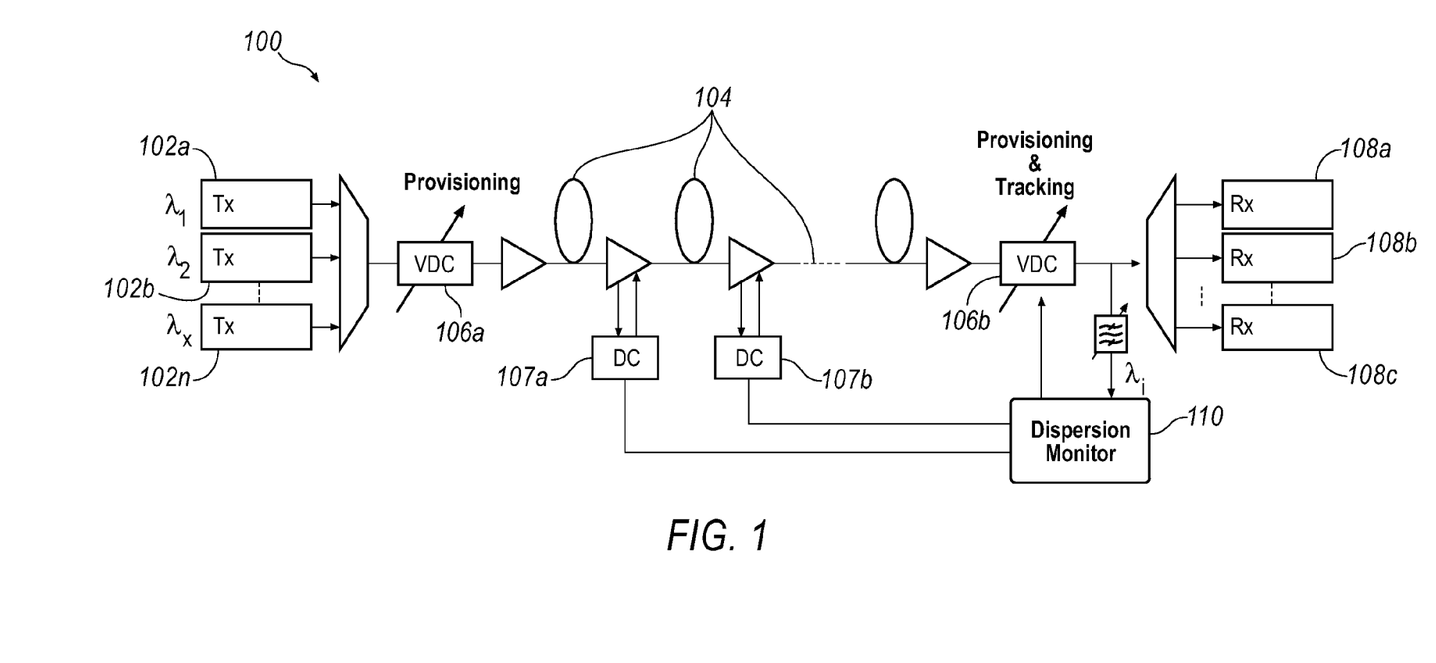
FIG. 1 illustrates a schematic illustration of an exemplary variable dispersion compensation system.

Turning now to FIG. 1, an exemplary dispersion compensation system 100 is illustrated. Dispersion compensation system 100 may generally include a plurality of transmitters 102a through 102n. Any number of transmitters 102 may generally transmit a corresponding plurality of signals, e.g., optical signals, each having an associated wavelength or range of wavelengths $\lambda_1, \lambda_2, \lambda_3 \ldots \lambda_x$, to a plurality of receivers 108a through 102n. The transmitters 102 may generally transmit communication signals, such as optical signals, via a communication media 104. In some exemplary illustrations, communication media 104 includes optical fibers.

System 100 may also include one or more dispersion monitors or controllers 110 that are configured to measure dispersion at one or more locations along communication media 104. The dispersion monitor 110 may be in communication with one or more variable dispersion compensation (VDC) devices 106a, 106b. Dispersion of any signal being transmitted through the system 100, e.g., a signal from a given transmitter 102 at a given wavelength $\lambda_i$, may be measured at any point along the communication media 104. For example, as shown in FIG. 1, one or more dispersion measurement devices 107a, 107b may be provided at one or more locations in system 100 to measure dispersion occurring in any of the signals sent by the transmitters 102. Dispersion compensation devices 106 may be generally configured to correct or compensate for dispersion along the communication media 104. For example, as will be described further below dispersion compensation devices 106 may generally receive an incoming signal such as an optical signal, apply a correction or compensation to the incoming signal, and then transmit a corrected or compensation-free signal. More specifically, the dispersion compensation devices 106 may reflect an optical signal off of a curved surface, thereby compensating for dispersion that is detected in the system 100 by the monitor(s) 110.

Figure 2A:
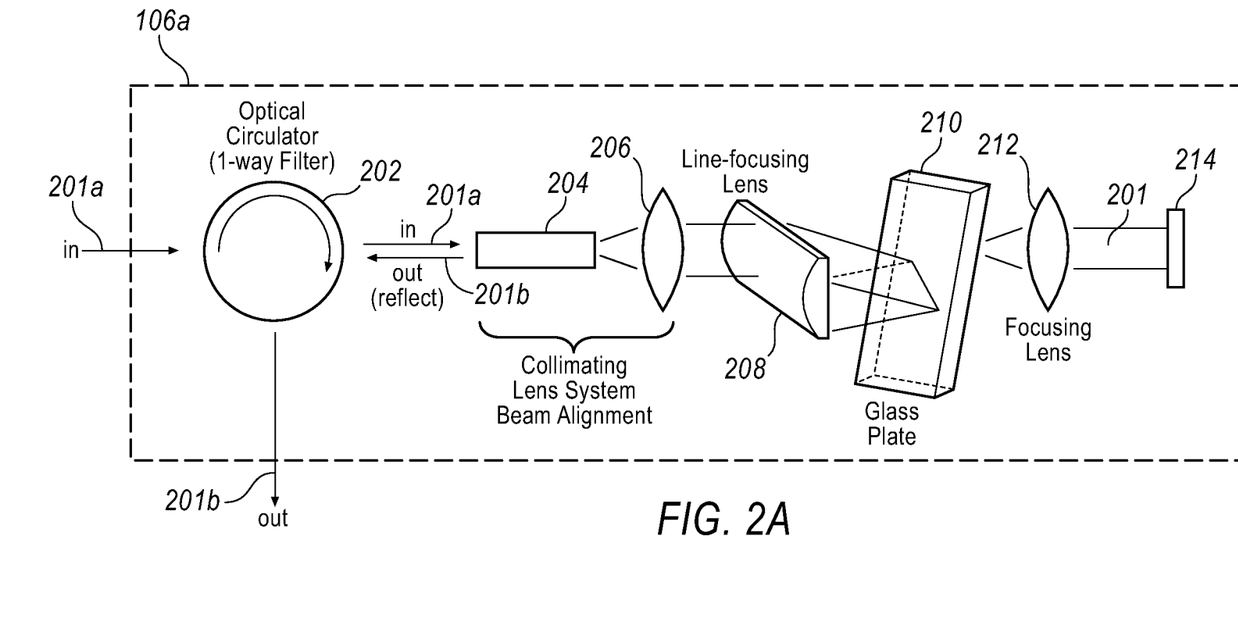
FIG. 2A illustrates a schematic illustration of an exemplary dispersion compensation device used in the exemplary system of FIG. 1.

Turning now to FIG. 2A, an exemplary dispersion compensation device 106a is described in further detail. Dispersion compensation device 106a generally receives an incoming optical signal 201a, applies a correction or compensation for dispersion that may be distort the incoming signal 201a, and outputs a corrected or compensated signal 201b. In some exemplary illustrations, dispersion may be corrected by reflecting an optical signal off of a curved surface, such that the reflected signal is adjusted for any effects of dispersion.

The dispersion compensation device 106a may include an optical circulator 202, which generally functions as a one-way filter with respect to the incoming signal 201a. More specifically, the optical circulator 202 allows the incoming signal 201a to be transmitted through the device to generally apply compensation, while not permitting the incoming optical signal 201a to be reflected back, e.g., into the communication media 104 transmitting incoming signal 201a to the dispersion compensation device 106a. Accordingly, the optical circulator 202 permits the receipt of incoming signal 201a into the device 106a and prevents interference of the incoming signal 201a with the corrected or outgoing signal 201b.

The dispersion compensation device 106a may further include a beam alignment device 204 and a collimating lens 206. The collimating lens 206 generally expands the width of incoming signal 201a. Additionally, the beam alignment mechanism tool 204 generally aligns the incoming signal 201a with the collimating lens 206. The collimating lens 206 and beam alignment device may generally cooperate to expand the incoming beam of an optical signal. Expansion of an optical signal, e.g., signal 201a, may generally facilitate a more precise application of dispersion compensation by the device 106a. For example, incoming signal 201a may be very small in width, and therefore enlargement of the width of the signal 201a by the collimating lens 206 may more closely match the size of the signal 201a to a relatively larger curved surface used to correct for dispersion, as will be described further below.

The dispersion compensation device 106a may further include a line focusing lens 208 which generally narrows the signal 201a. The line focusing lens 208 may focus the incoming signal 201a onto a wavelength screen or plate 210. The line focusing lens 208 may generally narrow the incoming signal 201a in a direction perpendicular to the travel of the incoming signal 201a. In one exemplary illustration, the signal 201a may be in a generally cylindrical or beam shape, as may be typical of optical signals generally. Accordingly, the line focusing lens 208 may generally convert the cylindrical beam into a plane or line where the signal 201a meets the next component of the dispersion compensation device 106a. For example, as best seen in FIG. 2A, line focusing lens 208 may generally narrow the height of the incoming signal 201a, such that the incoming signal 201a has a planar shape where it impinges upon the glass plate 210. Accordingly, the signal 201a forms a straight line where the signal 201a intersects the plate 210.

The glass plate 210 may be employed to generally filter or block desired wavelengths present in the incoming signal 201a. For example, glass plate 210 may have a coating (not shown) that is configured to prevent transmission of a range of wavelengths present in the incoming signal 201a.

The dispersion compensation device 106a may further include a focusing lens 212. The focusing lens 212 may focus the incoming signal 201a in any manner that is convenient, e.g., for reflecting by a dispersion compensation array 214. For example, as will be described further below the incoming signal 201a may be focused into a generally planar shape, thus impinging upon the dispersion compensation array 214 in a plane.

Variable dispersion compensation array 214, as will be described further below, may include a plurality of discrete elements for compensating or correcting for dispersion that may be present in the incoming signal 201a. In one exemplary illustration, the dispersion compensation array 214 is a microelectronic mirror (MEM) that is programmable or otherwise controlled remotely, e.g., via the dispersion monitor 110. Furthermore, the variable dispersion compensation array 214 may apply positive or negative dispersion compensation to a given signal 201a. Each of the discrete elements may be independently movable, to allow the formation of any curved surface that may be convenient for compensating for dispersion in an optical signal, e.g., signal 201a. The variable dispersion compensation array 214 may generally present a curved surface in a number of selectively applied configurations, thereby applying dispersion compensation as may be desired to the incoming signal 201a. Dispersion compensation may be applied in either positive or negative magnitudes to the incoming signal 201a, depending on whether the reflecting surface presented by the array 214 is convex or concave. Additionally, as the array 214 does not require a symmetric curved surface, dispersion compensation may be applied asymmetrically, e.g., by presenting a curved surface along the array 214 that is asymmetric with respect to incoming signal 201a.

It should be noted that FIGS. 2B, 2C, 2D, 2E, and 2F illustrating exemplary dispersion compensation arrays 214 are schematic in nature and are not to scale. Signal 201 may generally be very small in width, and the compensation elements 216 may be even smaller. In one exemplary illustration, the dispersion compensation elements 216 only measure a few micrometers across. Accordingly, while only a handful of compensation elements 216 are illustrated in the exemplary arrays 214, a relatively larger number of compensation elements 216 may be provided. Further, while features of the compensation arrays 214 and elements 216 thereof are exaggerated in these Figures to describe their operation generally, the compensation elements 216 may generally be numerous and small enough to collectively form substantially smooth curved surfaces in order to compensate dispersion present in the signal 201. For example, surrounding portions such as the frames and/or "gaps" between the elements 216 in the arrays 214 may generally be so small as to be insignificant in the context of the many elements 216 that cooperate to form a curved surface.

Figure 2B:
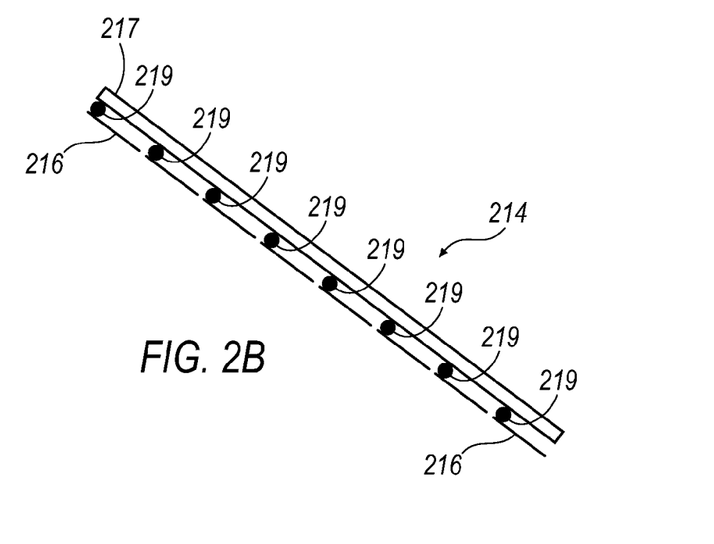
FIG. 2B illustrates a schematic illustration of an exemplary dispersion compensation array used in the exemplary device of FIG. 2A.
Figure 2C:
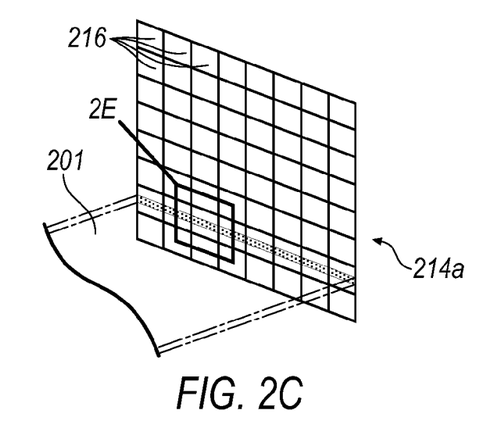
FIG. 2C illustrates an exemplary dispersion compensation array having a generally quadrangular shape.

Turning now to FIGS. 2B and 2C, an exemplary dispersion compensation array 214a is described in further detail. The dispersion compensation array 214a may generally include three functional components. More specifically, the dispersion compensation array 214a includes a plurality of selectively angled dispersion compensation elements 216, a backing layer 217, and hinges 219 that secure the elements 216 to the backing layer 217. The hinges 219 generally facilitate relative rotation of each of the elements 216 with respect to the backing layer 217. While shown in FIG. 2B as being disposed on a side of each of the compensation elements 216, the Figure is merely a schematic representation of the functional components of the array 214, and the hinges 219 need not be disposed on a side of the elements 216. Furthermore, as described further below, the hinges 219 may allow rotation of the elements 216 with respect to the backing layer 217 about multiple axes.

In one exemplary illustration, the compensation elements 216 are mirrored surfaces that are etched from the backing layer 217, leaving one or more thinned portions (not shown in FIG. 2B or 2C) that may serve as the hinge(s) 219. Accordingly, in such examples, the thinned portion may be a living hinge between the elements 216 and the backing layer 217. Accordingly, the compensation elements 216 and hinges 119 may be integrally formed in an etching process associated with the backing layer 217.

In another exemplary illustration, any of the compensation elements 216, backing layer 217, and/or hinges 219 may be formed of an electrically responsive material that facilitates movement of compensation elements 216 relative to the backing layer 217. For example, backing layer 217 may be a micro electronic circuit or integrated circuit that is generally responsive to changes in an applied electric potential or voltage. Accordingly, the hinges 219 and/or the integrated circuit 217 may rotate any one or more of the compensation elements 216 relative to the backing layer 217 according to an applied voltage or changes to an applied voltage. In another example, the hinges 219 are configured to respond to an applied electrical potential with varying levels of torque corresponding to the applied voltage. The compensation elements 216 may thereby be independently rotated with respect to the backing layer 217.

The generally square shape of dispersion compensation array 214 in one exemplary approach may be advantageous by allowing hinges 219 to be generally aligned with one another. More specifically, as shown in FIG. 2B the hinges 219 may be two-dimensional hinges, e.g., living hinges extending along an edge of the compensation elements 216, that are each disposed on a same side of the compensation elements 216. Accordingly, the compensation elements 216 may rotate in a same direction with respect to the backing layer 217. In such examples, the compensation elements 216 may be rotated to form curved surfaces in two dimensions.

Alternatively, compensation elements 216 may be configured to allow for rotation of in three dimensions, which may offer greater flexibility in applying dispersion compensation to a signal 201a as a result of the additional degree of freedom in forming curved surfaces collectively with the compensation elements 216.

Dispersion compensation array 214 may take any geometrical shape or configuration that is convenient, such as square, triangular, or circular, merely as examples. A generally square dispersion compensation array 214 is shown in FIGS. 2B and 2C. Dispersion compensation array 214 may include a plurality of compensation elements 216 in the form of mirrored surfaces that are arranged in a generally square array. The compensation elements 216 are arranged in a grid having eight columns and rows, resulting in 64 total compensation elements 216 in the dispersion compensation array 214. A square array may generally allow for positioning of hinges 219 along a same side of the compensation elements 216, thereby allowing for alignment of the rotation of compensation elements 216 in a same plane, as described above.

Figure 2D:
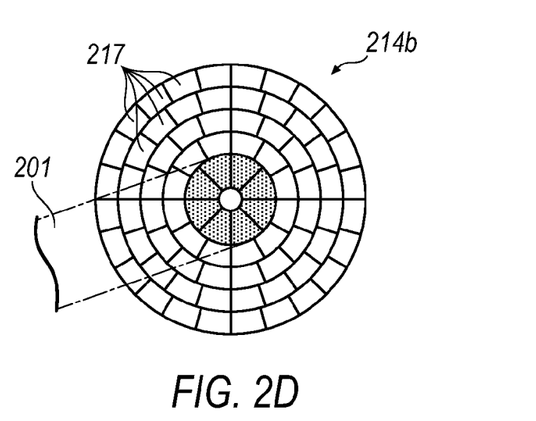
FIG. 2D illustrates an exemplary dispersion compensation array having a generally circular shape.

Turning now to FIG. 2D, another exemplary dispersion compensation array 214b is illustrated. The dispersion compensation array 214b is generally circular. However, the concept of applying compensation may be generally similar to that described above regarding compensation array 214a. A generally circular array, for example as illustrated in FIG. 2D, may be convenient where the signal 201 has a generally circular cross-section or is otherwise similarly shaped in cross-section as the generally circular shape of the dispersion compensation array 214b, in order to more closely match the shape of the beam of the signal 201 to the compensation elements 216 used to form a curved surface and compensate for dispersion in the signal 201.

Figure 2E:
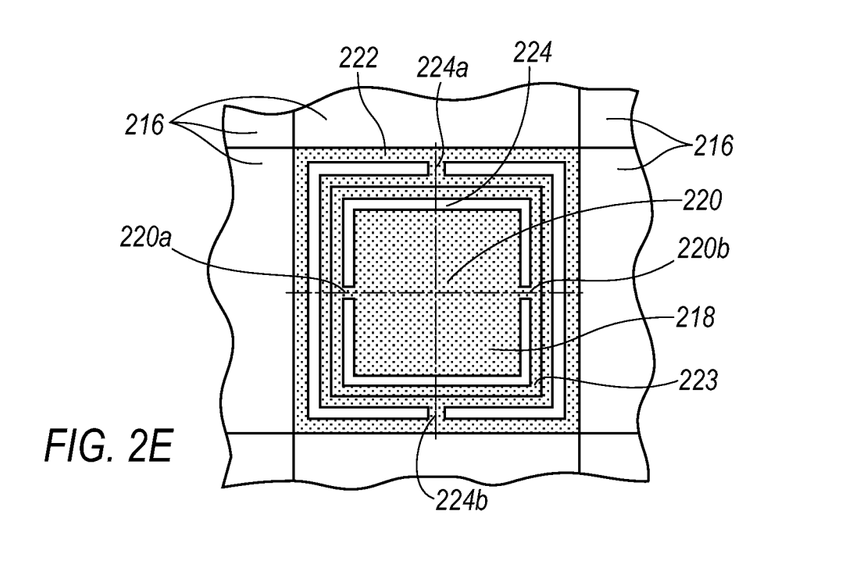
FIG. 2E illustrates an exemplary dispersion compensation element used in the exemplary dispersion compensation arrays of FIGS. 2B, 2C, and/or 2D.

Turning now to FIG. 2E, an exemplary dispersion compensation element 216 having two hinges is illustrated in further detail. Dispersion compensation element 216 may generally include a reflector 218 that is hinged to allow rotation about two axes. More specifically, the reflector 218 is hinged along a first axis 220 and a second axis 224 disposed generally perpendicular to the first axis 220. Reflector 218 may be hinged about the first axis 220 via two opposing leg portions 220a, 220b. The leg portions 220a, 220b allow rotation of the reflector 218 with respect to a first circumferential frame 223 that extends generally about the perimeter of the reflector 218. The first circumferential frame 223 may itself be hinged with respect to an outer circumferential frame 222. More specifically, the first circumferential frame 223 may be configured to rotate about axis 224 via opposing legs 224a, 224b. Accordingly, the reflector 218 of the compensation element 216 may rotate with respect to the base portion 217 of the variable dispersion compensation array 214 about two axes. The reflectors 218 of the compensation elements 216 may thereby be collectively angled relative to the base portion 217 to form three-dimensional curved surfaces in order to apply dispersion compensation to a signal 201.

Figure 2F:
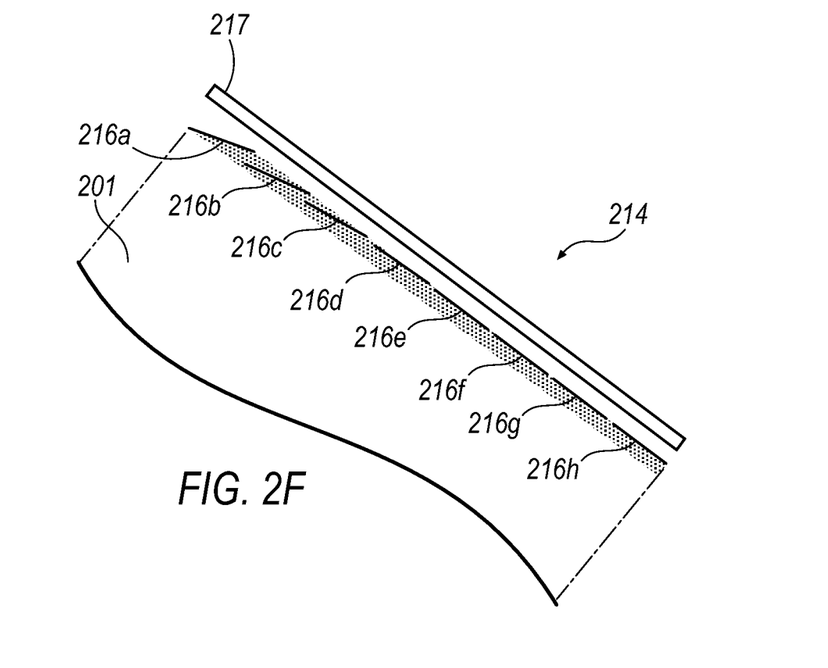
FIG. 2F illustrates the exemplary quadrangular dispersion compensation array of FIG. 2C applying an asymmetrical dispersion compensation to an incoming signal.

FIG. 2F illustrates variable dispersion compensation array 214 where a portion of the compensation elements are rotated in an asymmetric manner, thereby allowing for asymmetric dispersion compensation. More specifically, a single row of dispersion compensation elements 216 reflect the incoming planar signal 201a in an asymmetrical manner. As shown in FIG. 2F, dispersion compensation elements 216a, 216b, 216c, and 216d each define different angles with respect to base portion 217, while elements 216e, 216f, 216g, and 216h are substantially parallel to the base portion 217. Accordingly, elements 216e-216h will simply reflect the portion of the generally planar signal 201 that impinges upon elements 216e-216h. Moreover, elements 216d, 216c, 216b, and 216a form angles with respect to base portion 217 increasing in magnitude moving toward the outer edge of the array 214, i.e., element 216a. Accordingly, the overall curve presented by compensation elements 216 is asymmetrical about the center of the signal 201, and the array 214 may thereby compensate dispersion in the signal 201 in a correspondingly asymmetric manner. Moreover, as the elements 216a, 216b, 216c, and 216d define angles of decreasing magnitude, the portions of the signal 201 impinging on these elements are corrected in correspondingly decreasing degrees, thereby compensating for dispersion to correspondingly varying degrees across the generally planar signal 201. By contrast, previously known three-dimensional mirrors are provided with a symmetric curve, and therefore may overcompensate or undercompensate portions of the signal 201 when dispersion is not symmetrical. The exemplary dispersion compensation array 214 may thereby compensate for dispersion in a targeted manner across a width of the planar signal 201 impinging upon the array 214.

As described above, movement of any one or more of compensation elements 216 may be coordinated by a dispersion monitor or controller 110 in communication with the dispersion compensation array 214. The controller 110 may be configured to enact movement of each of the compensation elements 216, e.g., according to a voltage applied to the dispersion compensation array 214 by the controller 110. Accordingly, movement of any one or more of the compensation elements 216 may be controlled remotely, e.g., by a central office or administrator of system 100.

Computing devices in various examples, such as controller 118, may each include instructions executable by one or more computing devices such as those listed above. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any tangible medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, as described hereinafter, or any other medium from which a computer can read.

Figure 3:
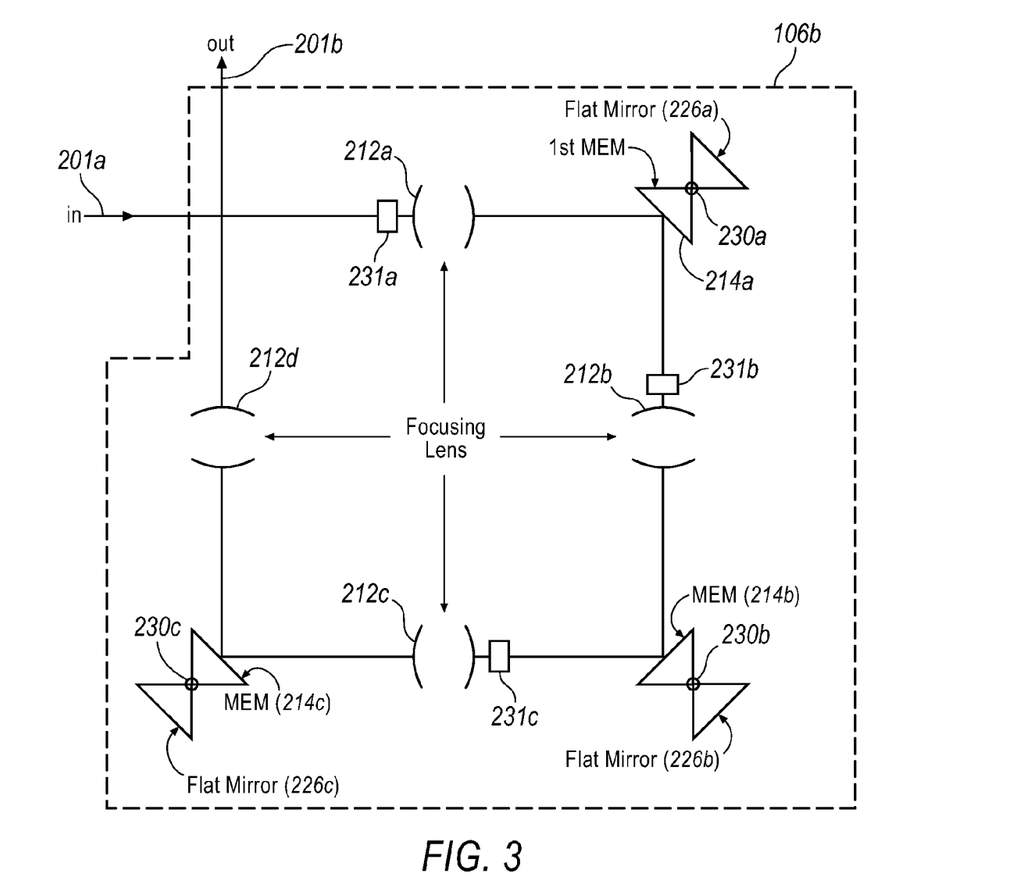
FIG. 3 illustrates an exemplary dispersion compensation device employing a plurality of arrays.

Turning now to FIG. 3, another exemplary dispersion compensation device 106b is illustrated in further detail. Dispersion compensation device 106b includes a plurality of dispersion compensation arrays 214. In the example illustrated, the dispersion compensation device 106b includes three dispersion compensation arrays 214a, 214b, and 214c each of which have an associated focusing lens 212a, 212b, and 212c. Each of the focusing lenses 212a, 212b, and 212c may generally focus the incoming signal 201a as desired prior to impinging the signal 201a upon the respective arrays 214a, 214b, and 214c. A further focusing lens 212d may be provided for focusing a corrected signal 201b, e.g., for receipt by a communication media (not shown in FIG. 3).

Additionally, each of the arrays 214 may have an associated signal monitor 231a, 231b, and 231c. The signal monitors 231 may each include devices for adjusting a signal strength or power of the incoming signal 201a, e.g., a signal amplifier. The signal monitors 231 may each include, in one exemplary illustration, an optical power sensor that can be located on or incorporated into their associated compensation array 214. If optical power amplification is desired for an optical multi-channel (e.g., broadband wavelength division multiplex or DWDM) signal, the optical power sensor 231 may be located upstream or before the optical de-multiplex to provide multi-channel amplification. Alternatively, the optical power sensor 231 may be positioned downstream or after the optical de-multiplex for each single DWDM channel (i.e., post-amplifier for the optical transmission system).

While each of the dispersion compensation arrays 214 operates substantially as described above for the exemplary dispersion compensation array 214, a number of advantages may be realized by employing a plurality of dispersion compensation arrays 214 in a sequential manner, e.g., as shown in FIG. 3. Merely as an example, overall dispersion compensation capability may be increased by providing multiple dispersion compensation arrays 214. Additionally, applying compensation in multiple stages corresponding to the multiple arrays may allow for compensation to be applied more accurately in smaller increments for each array, instead of applying the full amount with a single array 214. Another advantage is increased flexibility and durability of the dispersion compensation device 106b, as the arrays 214 may be used in turns, minimizing wear on the arrays 214. The arrays 214 may also provide redundancies to allow one array 214b to be used in place of array 214a, e.g., when array 214a is being serviced or is otherwise not available. Moreover, while FIG. 3 shows three arrays 214 provided in a sequential arrangement, any number of arrays 214 may be provided in the stacked arrangement generally illustrated, in order to increase an overall dispersion compensation capacity and/or increase flexibility in correcting dispersion.

As illustrated in FIG. 3, each array 214 includes a substantially flat mirrored surface opposite the array 214. More specifically, the first compensation array 214a includes a mirrored surface 226a disposed opposite the array 214a with respect to a pivot 230a. Similarly, the second dispersion compensation array 214b is disposed opposite a flat mirror 226b with respect to a pivot 230b. Finally, third compensation array 214c is disposed opposite a flat mirror 226c with respect to a pivot 230c.

When one or more arrays 214 included in an available plurality of arrays 214 are not needed, e.g., when dispersion is adequately compensated by only one or two of the compensation arrays 214, the pivot 230 of the relevant array 214 may be rotated to reflect the incoming signal 201a using the flat mirror 226. Accordingly, the dispersion compensation array 214 paired with the given mirror 226 is not used during that time. The compensation arrays 214 may thereby be selectively employed to compensate for dispersion present in the incoming signal 201a. As noted above, the generally sequential provision of multiple compensation arrays 214 may generally increase overall capability and further may increase quality of the dispersion compensation, as compensation may be applied in sequential and smaller increments. Additionally, dispersion compensation may be measured, e.g., by signal monitors 231, as may be convenient to determine an amount of compensation needed to correct dispersion in the signal 201a, as will be described further below.

As an illustration, dispersion compensation device 106b may apply an overall dispersion compensation of 1000 picoseconds to signal 201a. The compensation applied by the three arrays 214 may be divided in any manner that is convenient. For example, if each array 214 has a maximum compensation of 500 picoseconds, then the compensation may be split evenly between arrays 214a and 214b, while the array 214c is pivoted such that the signal 201 is reflected by the flat mirror 226c. In other words, arrays 214a and 214b may each apply a compensation of 500 picoseconds to the signal 201a, while no compensation is applied by array 214c.

Figure 4:
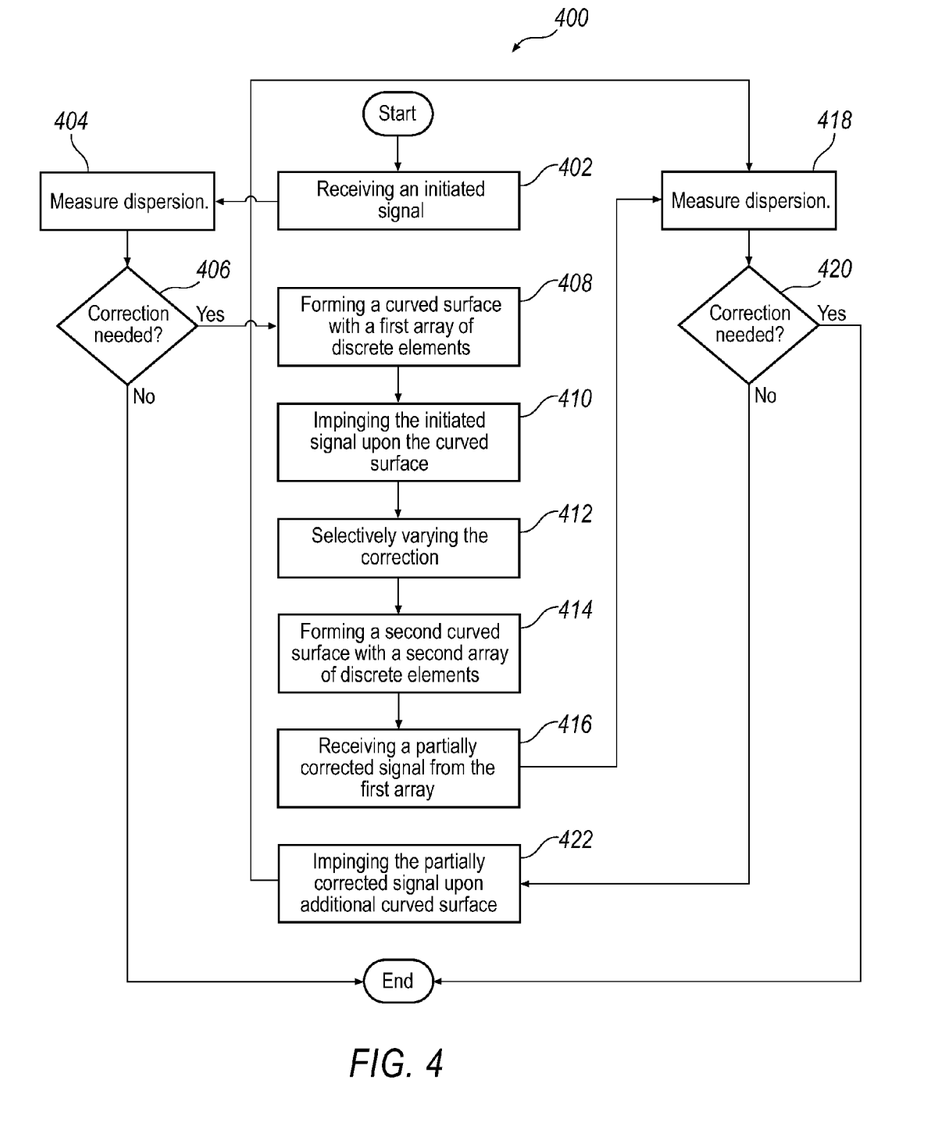
FIG. 4 illustrates a process flow diagram of an exemplary method for applying dispersion compensation to a signal.

Turning now to FIG. 4, an exemplary process 400 for correcting or compensating for an error, e.g., dispersion, in an initiated signal is illustrated. Process 400 may generally begin at block 402, where an initiated signal, e.g., signal 201a, may be received. The initiated signal 201a may be received, e.g., from a light-transmitting material such as an optical fiber.

Proceeding to block 404, the initiated signal may be analyzed to determine whether any correction, e.g., dispersion compensation, is necessary. For example, as described above dispersion monitor 110 may measure dispersion directly or may be in communication with one or more separate devices for measuring dispersion in an initiated signal 201a, e.g., dispersion measurement devices 107 or signal monitors 231, at various positions in the system 100. Process 400 may then proceed to block 406.

At block 406, process 400 may query whether a correction to the signal is needed or desired. For example, if dispersion in the signal 201a does not exceed a predetermined amount, compensation may not be needed, and process 400 may then terminate. Alternatively, if at least a minimum level of dispersion is present in the signal 201a, it may be desirable to compensate the signal 201a to remove or at least reduce the dispersion, and process 400 may proceed to block 408.

Proceeding to block 408, a curved surface may be formed with a first array of discrete compensation elements. For example, as described above, a curved surface may be formed by a plurality of discrete elements 216 included in a dispersion compensation array 214. More specifically, as provided above the discrete elements 216 may be selectively rotatable with respect to at least two axes of the respective discrete elements. Accordingly, any number of curved surfaces for correcting an error in a signal, e.g., dispersion that may accumulate in an optical signal, may be employed. The discrete elements 216 may each include reflectors 218, or may otherwise include reflective surfaces for compensating dispersion by redirecting portions of the signal 201a.

Proceeding to block 410, the initiated signal may be impinged upon the curved surface. For example, as described above an initiated signal 201a may be reflected off of the curved surface formed collectively by the dispersion compensation elements 216. Process 400 may then proceed to block 412.

At block 412, a correction applied by the curved surface and/or the plurality of discrete elements may be selectively varied. For example, the discrete elements 216 may each be independently rotated with respect a base portion 217 of a compensation array 214, thereby allowing the discrete elements 216 to collectively form any number of two-dimensional or three-dimensional curved surfaces. Accordingly, any correction such as dispersion compensation may be applied to the signal 201a that is convenient.

Proceeding to block 414, a second curved surface may be formed with a second array of discrete elements. For example, as described above, additional arrays 214b and 214c may be provided to allow for a layered or sequential application of a correction to the signal 201a. Process 400 may then proceed to block 416.

At block 416, a partially corrected signal may be received from the first array of discrete elements. For example, as described above a first array 214 may apply a first compensation to the signal 201a, which is then reflected through focusing lens 212b. Process 400 may then proceed to block 418.

At block 418, a dispersion present in the signal may be measured. For example, the dispersion measurement device 107 and/or the signal monitor 231 may measure dispersion present in the signal 201a.

Proceeding to block 420, process 400 may query whether dispersion has been removed or sufficiently reduced from an incoming signal 201a. For example, if dispersion in the signal 201a has been adequately compensated by the first dispersion array 214, then process 400 may terminate. On the other hand, if dispersion has not been entirely corrected in the signal 201a, i.e., either positive or negative dispersion is still present in the signal 201a, process 400 may proceed to block 422.

At block 422, the partially corrected signal may be impinged or reflected upon an additional curved surface, e.g., as formed by one of the secondary compensation arrays 214b and/or 214c. Accordingly, the signal 201a may be at least partially corrected by the first array 214a by the time it is received by the next array 214b, and may be further compensated by an additional array 214b and/or 214c, e.g., depending on whether the previous compensation array 214 has appropriately corrected the signal 201a, e.g., by substantially removing dispersion from the signal 201a. Correction or compensation of an error such as optical dispersion may thereby be selectively applied in stages.

Figure 5:
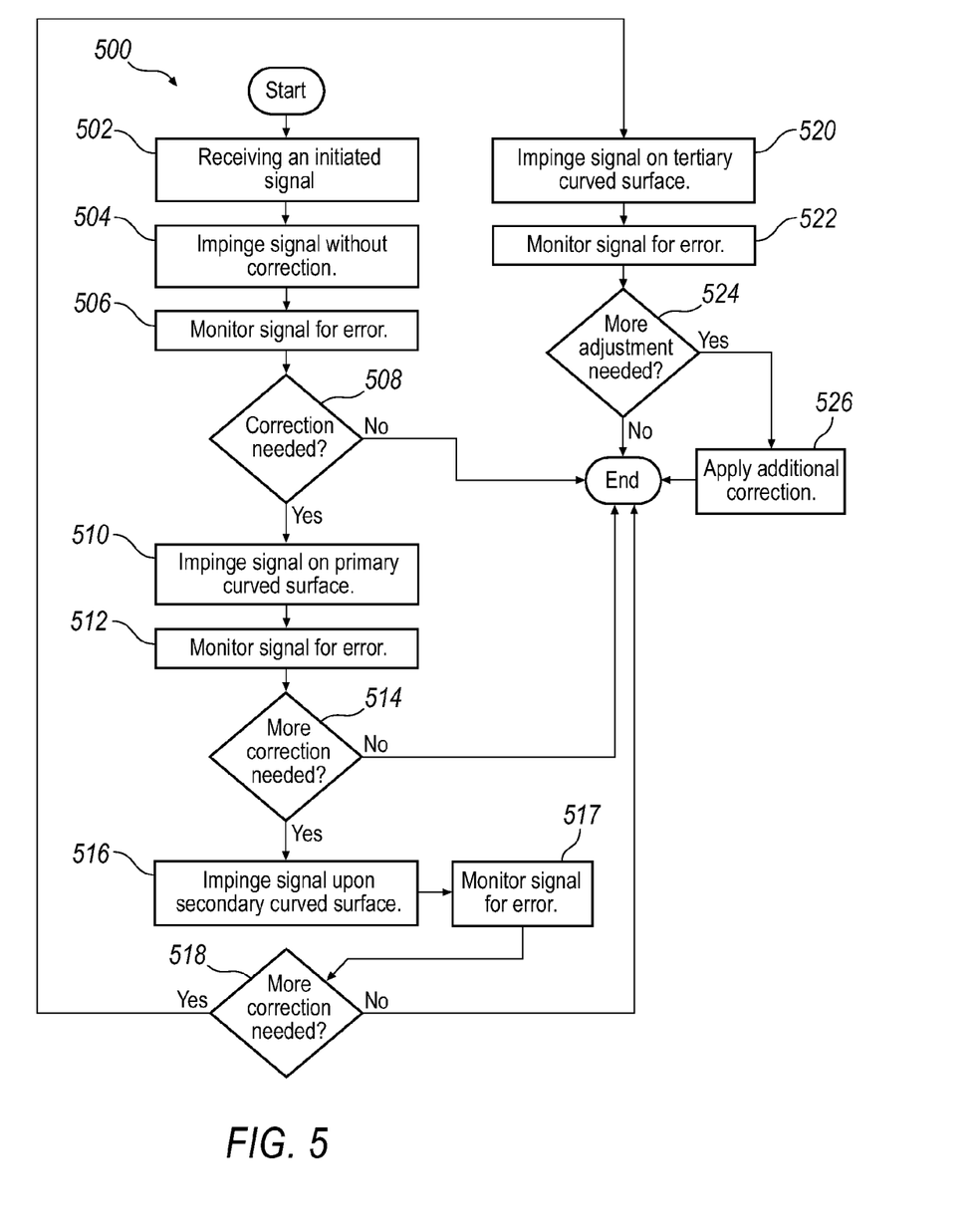
FIG. 5 illustrates a process flow diagram of another exemplary method for applying dispersion compensation to a signal.

Turning now to FIG. 5, another exemplary process 500 for correcting or compensating for an error, e.g., dispersion, in an initiated signal is illustrated. Process 500 may begin at block 502, where an initiated signal, e.g., signal 201a, may be received. The initiated signal 201a may be received, e.g., from a light-transmitting material such as an optical fiber.

Proceeding to block 504, the initiated signal 201a may be transmitted through a compensation array without correction being applied to the signal 201a. For example, as described above signal 201a may be received by a compensation device 106b having flat mirrors 226 for reflecting the signal 201a without applying a correction, e.g., for compensation, to the signal 201a. Accordingly, when compensation is not desired or otherwise unnecessary, the signal 201a may be reflected from flat mirror 226a, to flat mirror 226b and flat mirror 226c, before being transmitted back to the system 100. Process 500 may then proceed to block 506.

At block 506, the signal may be monitored for the presence of an error, e.g., dispersion. For example, the dispersion measurement device 107 and/or the signal monitor 231 may measure dispersion present in the signal 201a.

Proceeding to block 508, process 500 may query whether an error in the signal, e.g., dispersion in signal 201a, is present and requires correction. For example, if dispersion in the signal 201a is absent or sufficiently low that no correction is required, process 500 may terminate. On the other hand, if dispersion is present in the signal 201a, i.e., positive or negative dispersion, process 500 may proceed to block 510.

At block 510, the signal 201a may be impinged or reflected upon a primary curved surface, e.g., as formed by one of the compensation arrays 214. For example, the signal 201a may be reflected off of the first array 214a by rotating the array 214a about the pivot 230a. Moreover, the array 214a may be curved to provide an appropriate amount of correction. An amount of correction applied by array 214a may be determined in part by the amount of error detected in the signal 201a, e.g., at block 508. Process 500 may then proceed to block 512.

At block 512, the signal may again be monitored for the presence of an error, e.g., dispersion. For example, the dispersion measurement device 107 and/or the signal monitor 231 may measure dispersion present in the signal 201a, and determine whether correction applied, e.g., at block 510, has been effective in sufficiently reducing the error in the signal 201a.

Proceeding to block 514, process 500 may query whether error present in the signal 201a has been removed or sufficiently reduced. For example, if an error, e.g., dispersion, in the signal 201a has been adequately compensated by the primary dispersion array 214, then process 500 may terminate. On the other hand, if dispersion has not been entirely corrected in the signal 201a, i.e., either positive or negative dispersion is still present in the signal 201a, process 500 may proceed to block 516.

At block 516, the partially corrected signal may be impinged or reflected upon a secondary curved surface, e.g., as formed by one of the secondary compensation arrays 214b or 214c. For example, the signal 201a may be reflected off of the second compensation array 214b by rotating the array 214b about the pivot 230b. Moreover, the array 214b may be curved to provide an appropriate amount of correction, in combination with the primary compensation array 214a. An amount of correction applied by the arrays 214a and/or 214b may be determined in part by the amount of error detected in the signal 201a, e.g., at blocks 508 and/or 514. Accordingly, a separate correction factor may be selectively applied to the signal 201a by the secondary array 214b, in addition to compensation provided by the primary compensation array 214a. Process 500 may then proceed to block 517.

At block 517, the signal may be monitored for the presence of an error, e.g., dispersion. For example, the dispersion measurement device 107 and/or the signal monitor 231 may measure dispersion present in the signal 201a, and determine whether correction applied, e.g., at blocks 510 and/or 516, has been effective in sufficiently reducing the error in the signal 201a.

Proceeding to block 518, process 500 may again query whether error present in the signal 201a has been removed or sufficiently reduced. For example, if an error, e.g., dispersion, in the signal 201a has been adequately compensated by the primary and secondary dispersion arrays 214, then process 500 may terminate. On the other hand, if dispersion has not been entirely corrected in the signal 201a, i.e., either positive or negative dispersion is still present in the signal 201a, process 500 may proceed to block 520.

At block 520, the partially corrected signal may be impinged or reflected upon a tertiary curved surface, e.g., as formed by a remaining available compensation array 214b or 214c. For example, the signal 201a may be reflected off of the third compensation array 214c by rotating the array 214c about the pivot 230c. Moreover, the array 214c may be curved to provide an appropriate amount of correction, in combination with the primary and secondary compensation arrays 214a, 214b employed at blocks 504 and 510 as described above. An amount of correction applied by the arrays 214a and/or 214b and/or 214c may be determined in part by the amount of error detected in the signal 201a, e.g., at blocks 508 and/or 514 and/or 518. Accordingly, an additional separate correction factor may be selectively applied to the signal 201a by the tertiary array 214c, in addition to compensation provided by the primary and secondary compensation arrays 214a, 214b. Process 500 may then proceed to block 522.

At block 522, the signal may again be monitored for the presence of an error, e.g., dispersion. For example, the dispersion measurement device 107 and/or the signal monitor 231 may measure dispersion present in the signal 201a, and determine whether correction applied, e.g., at blocks 510, 516, and 520, has been effective in sufficiently reducing the error in the signal 201a.

Proceeding to block 524, process 500 may query whether error present in the signal 201a has been removed or sufficiently reduced. For example, if an error, e.g., dispersion, in the signal 201a has been adequately compensated by the primary, secondary, and tertiary dispersion arrays 214, then process 500 may terminate. On the other hand, if dispersion has not been entirely corrected in the signal 201a, i.e., either positive or negative dispersion is still present in the signal 201a, process 500 may proceed to block 526.

At block 526, additional correction may be applied to the signal 201a. For example, additional dispersion compensation devices may be provided, e.g., additional compensation arrays 214, to apply still more correction to the signal 201a. Accordingly, if an amount of compensation applied by the primary, secondary, and tertiary compensation arrays 214a, 214b, and 214c has not sufficiently reduced error in the signal 201a, compensation may be still further reduced. Process 500 may then terminate.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a transmitter configured to selectively transmit an initiated signal;
at least one communication media in communication with the transmitter; and
a correction device in communication with the transmitter via the communication media, the correction device including a plurality of reflection units arranged in series and configured such that:
a first reflection unit of the plurality of reflection units receives the initiated signal from the communication media and reflects the initiated signal towards a next one of the plurality of reflection units;
a last reflection unit of the plurality of reflection units receives the initiated signal as reflected from a previous one of the plurality of reflection units and reflects the initiated signal towards an output path;

each of the plurality of reflection units other than the first reflection unit and the last reflection unit receives the initiated signal as reflected by a previous one of the plurality of reflection units and reflects the initiated signal towards a next one of the plurality of reflection units;

wherein each of the plurality of reflection units includes a compensation array that includes a plurality of discrete reflection elements, and each of the plurality of reflection units is configured to selectively switch between a correction state and a no-correction state such that, in the correction state the compensation array of the respective correction unit is configured to apply a variably selectable correction to the initiated signal by variably arranging the plurality of discrete reflection elements and reflecting the initiated signal off of the plurality of discrete elements, and in the no-correction state the respective reflection unit reflects the initiated signal without applying a correction.

2. The system of claim 1, wherein, in the compensation array of each of the plurality of reflection units, the plurality of discrete reflection elements are configured to collectively form a reflection profile substantially equivalent to that of a curved surface to apply the correction to the initiated signal.

3. The system of claim 2, wherein the curved surface is asymmetrical, thereby varying the correction across a width of the initiated signal, wherein the discrete reflection elements are independently rotatable with respect to each other.

4. The system of claim 2, wherein the plurality of discrete reflection elements are selectively rotatable with respect to at least one axis of the respective discrete reflection elements.

5. The system of claim 1, wherein the discrete reflection elements include a plurality of mirrored surfaces configured to reflect the initiated signal.

6. The system of claim 1, wherein the communication media includes optical fibers.

7. The system of claim 1, wherein the correction includes a compensation for dispersion present in the initiated signal.

8. The system of claim 1, further comprising a controller in communication with the correction device, the controller being configured to selectively control switching of the plurality of reflection units between the correction state and the no-correction state and to selectively alter a curvature defined by the plurality of discrete reflection elements of the compensation array of each of the plurality of reflection units.

9. A dispersion compensation device, comprising:
at least one communication media selectively receiving an initiated signal; and
a correction device in communication with the at least one communication media, the correction device including a plurality of reflection units arranged in series and configured such that:
  a first reflection unit of the plurality of reflection units receives the initiated signal from the communication media and reflects the initiated signal towards a next one of the plurality of reflection units;
  a last reflection unit of the plurality of reflection units receives the initiated signal as reflected from a previous one of the plurality of reflection units and reflects the initiated signal towards an output path;
  each of the plurality of reflection units other than the first reflection unit and the last reflection unit receives the initiated signal as reflected by a previous one of the plurality of reflection units and reflects the initiated signal towards a next one of the plurality of reflection units;

wherein each of the plurality of reflection units includes a compensation array that includes a plurality of discrete reflection elements, and each of the plurality of reflection units is configured to selectively switch between a correction state and a no-correction state such that, in the correction state the compensation array of the respective correction unit is configured to apply a variably selectable correction to the initiated signal by variably arranging the plurality of discrete reflection elements and reflecting the initiated signal off of the plurality of discrete elements, and in the no-correction state the respective reflection unit reflects the initiated signal without applying a correction, wherein the plurality of discrete reflection elements are configured to collectively form a reflection profile substantially equivalent to that of a curved surface to apply the correction to the initiated signal, the correction including a compensation for dispersion present in the initiated signal.

10. The dispersion compensation device of claim 9, wherein the compensation array of each of the plurality of reflection units is configured to selectively form a plurality of reflection profiles with the plurality of discrete reflection elements.

11. The dispersion compensation device of claim 9, wherein the curved surface is asymmetrical, thereby varying the correction across a width of the initiated signal, wherein the discrete reflection elements are independently rotatable with respect to each other.

12. The dispersion compensation device of claim 9, wherein the communication media includes optical fibers.

13. The system of claim 1,
wherein each of the plurality of reflection units includes a flat mirror disposed opposite the compensation array of the respective reflection unit, and
wherein each of the plurality of reflection units is configured such that, when in the no-correction state, the flat mirror thereof is disposed in a path of the initiated signal, and when in the correction state, the compensation array thereof is in the path of the initiated signal instead of the flat mirror.

14. The dispersion compensation device of claim 9,
wherein each of the plurality of reflection units includes a flat mirror disposed opposite the compensation array of the respective reflection unit, and
wherein each of the plurality of reflection units is configured such that, when in the no-correction state, the flat mirror thereof is disposed in a path of the initiated signal, and when in the correction state, the compensation array thereof is in the path of the initiated signal instead of the flat mirror.

* * * * *